(12) United States Patent  
Wichitamornloet et al.

(10) Patent No.: US 10,514,018 B2  
(45) Date of Patent: Dec. 24, 2019

(54) SYSTEM FOR CONVERSION OF THE WHOLE KINETIC ENERGY OF SEA WAVE INTO ELECTRICITY BY ONE-WAY DIRECT DRIVE SHAFT CONVERTER, (ODSC SYSTEM)

(71) Applicants: Arthron Wichitamornloet, Bangkok (TH); Wanchai Yukphaen, Bangkok (TH)

(72) Inventors: Arthron Wichitamornloet, Bangkok (TH); Wanchai Yukphaen, Bangkok (TH)

( * ) Notice: Subject to any disclaimer, the term of this patent is extended or adjusted under 35 U.S.C. 154(b) by 196 days.

(21) Appl. No.: 15/529,878

(22) PCT Filed: Feb. 23, 2016

(86) PCT No.: PCT/TH2016/000012  
§ 371 (c)(1),  
(2) Date: May 25, 2017

(87) PCT Pub. No.: WO2016/137406  
PCT Pub. Date: Sep. 1, 2016

(65) Prior Publication Data  
US 2018/0335009 A1    Nov. 22, 2018

(30) Foreign Application Priority Data  
Feb. 26, 2015  (TH) ................................ 1501001035

(51) Int. Cl.  
*F03B 3/02*    (2006.01)
(52) U.S. Cl.  
CPC ............ *F03B 3/02* (2013.01); *F05B 2240/93* (2013.01); *Y02E 10/38* (2013.01)
(58) Field of Classification Search  
CPC .. F03B 3/02; F03B 13/20; Y02E 10/38; F05B 2240/93; F05B 2250/21  
(Continued)

(56) References Cited

U.S. PATENT DOCUMENTS 3,934,528 A * 1/1976 Horton .................. B63B 21/502  
                                                                    114/296  
4,553,037 A * 11/1985 Veazey ................... F03D 13/25  
                                                                    290/55  
(Continued)

FOREIGN PATENT DOCUMENTS

JP    2013024165 A    2/2013  
JP    2015203411 A    11/2015

OTHER PUBLICATIONS

Fraenkel, Peter, "Marine Current Turbines: Pioneering Tidal Stream Technology", Marine Current Turbines Ltd., 2008, United Kingdom.

(Continued)

*Primary Examiner* — Hoang M Nguyen  
(74) *Attorney, Agent, or Firm* — Innovation Capital Law Group, LLP; Vic Lin

(57) ABSTRACT

ODSC system is a system for conversion of the whole kinetic energy of sea wave, both in propagation and oscillation direction, into electricity. The ODSC system comprises 2 main structures, a tower and a floating power plant. A tower is utilized as a site station and a pivot of the floating power plant. The floating power plant with a triangle based pyramid framework keeps afloat along with the sea tide and always turns its front toward to the wave propagation direction. This self-alignment maximizes effectiveness of energy conversion by ODSC converter installed in the floating power plant. The ODSC converter comprises 3 main structures, a plurality of attenuators, a one-way clutch and meshing gear system, and a drive shaft, wherein the whole kinetic energy of the sea wave is captured, transformed, converted and integrated together into a powerful one-way driving torque. The powerful torque then drives an electric (Continued)

generation system directly. The electricity then is transmitted ashore via a submarine power cable.

20 Claims, 1 Drawing Sheet

(58) Field of Classification Search
USPC .................................................. 60/495–507
See application file for complete search history.

(56) References Cited

U.S. PATENT DOCUMENTS

| | | | |
|---|---|---|---|
| 4,781,023 A | 11/1988 | Gordon | |
| 5,899,637 A * | 5/1999 | Blanchard | B63B 27/24 114/257 |
| 6,476,511 B1 | 11/2002 | Yemm et al. | |
| 6,935,808 B1 * | 8/2005 | Dempster | B63B 35/44 405/28 |
| 8,823,196 B1 | 9/2014 | Gehring | |
| 2008/0157532 A1 * | 7/2008 | Loui | F03B 13/1815 290/53 |
| 2010/0219645 A1 * | 9/2010 | Yamamoto | F03D 1/04 290/55 |
| 2010/0278630 A1 * | 11/2010 | Yamamoto | F03D 1/02 415/60 |
| 2013/0313832 A1 | 11/2013 | Peckolt | |

OTHER PUBLICATIONS

Pelamis P-750 Wave Energy Converter, www.pelamiswave.com (2008).

Shaw, T.L., "La Rance Tidal Power Barrage Ecological Observations relevant to a Severn Barrage Project", Shawater Limited, Dec. 2006.

Whittaker, T.J.T, et al., "The Limpet Wave Power Project—The First Years of Operation", Faculty of Engineering, Queen's University Belfast (2004).

International Search Report & Written Opinion from corresponding International PCT Application No. PCT/TH2016/000012, 9 pages.

* cited by examiner

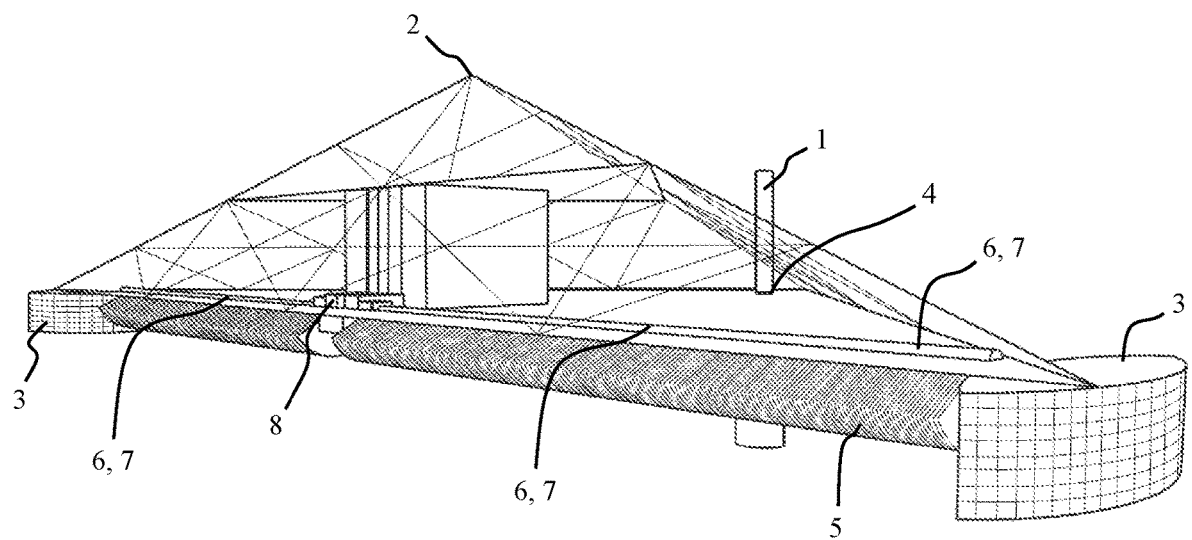

SYSTEM FOR CONVERSION OF THE WHOLE KINETIC ENERGY OF SEA WAVE INTO ELECTRICITY BY ONE-WAY DIRECT DRIVE SHAFT CONVERTER, (ODSC SYSTEM)

BACKGROUND OF THE INVENTION

1. Field of the Invention

The present invention relates to systems for utilizing whole kinetic energy of sea waves, and particularly to an apparatus for conversion sea wave energy to electrical energy.

2. Description of the Prior Art

Electricity demand is increasing continuously, but the supplies are getting stuck with increasing cost of exhausted fossil fuels in the future, pollutions from coal-fired power plants. The global warming from a greenhouse effect of the combustion of any kinds of fossil fuels is a new serious concern. Furthermore, many hydroelectric dams run dry by climate change, and the disaster of a nuclear power plant accident threatens the world. An alternative, sustainable, green energy technology is a new hope to solve the above problems. So renewable energy such as solar, wind, geo-thermal, tidal, and sea wave are utilized widely nowadays.

The sea is a huge, powerful storage of the solar energy. So many inventions and technologies are developed to utilize or harvest sea energy such as;
  a) The Rance tidal power station in France, a dam-like structure used to capture the energy from masses of water moving in and out of a barrage.
  b) The Islay LIMPET, a shoreline device uses an oscillating water column to drive air in and out of a pressure chamber through a turbine.
  c) The Pelamis Wave Energy Converter, a technology that uses the oscillating motion of the sea surface wave to create electricity.
  d) The SeaGen, a tidal stream turbine that harvests propagation flow of stream or tidal.

Nevertheless, many technologies invented to harvest the sea energy are not practical for commercial due to their poor efficiency, over expensive, or invalid by the restrictions of the site topography. Most of all are designed to harvest only one plane of sea kinetic energy. For example, The Islay LIMPET and The Pelamis Wave Energy Converter are designed to harvest sea energy only in the oscillation direction plane, or The SeaGen harvest sea energy in the propagation direction only. In addition, the sites employ an exaggerate area or volume that disturbing environment, ecology, fishery, tourism and navigation. An improved solution is desired to overcome these limitations.

BRIEF DESCRIPTION OF THE DRAWING

The invention is herein described, by way of example only, with reference to the accompanying drawings, wherein:

1 is a pole
2 is a floating power plant
3 is a pontoon
4 is a pivot point
5 is a plurality of attenuators/attenuator
6 is a one-way rotation clutch and gear system
7 is a drive shaft system
8 is an electric generation system

DETAILED DESCRIPTION

Drawing 1 is a simplified layout illustrating a system for conversion of sea wave energy, both in oscillation direction and propagation direction, by a breakthrough One-way Direct drive Shaft Converter (ODSC). The system comprises 2 main structures, a tower 1 and a floating power plant 2. The tower 1, is a site station and a pivot of the floating power plant 2, coupled into a massive concrete socket laid on the seabed. The floating power plant 2 with a steel frame, triangle based pyramid structure, keeps afloat by means of pontoons 3. The pontoons 3 with spindle-like or ship-like vessels are installed beneath the all three corners of the triangular base. The floating power plant 2 is coupled to the tower 1 at a pivot point 4. The pivot point 4 is settled at the front of the center of mass of the floating power plant 2. With these specific designs above, the floating power plant 2 always turns its front toward to the wave propagation direction while an ODSC converter system aligning perpendicular against the wave propagation direction at all time. This self-alignment maximizes an effective energy transfer.

The ODSC converter system is a one-way rotational, direct drive, shaft converter installed on the floor rearward of the floating power plant 2, comprising a plurality of attenuators 5, a one-way rotation clutch and meshing gear systems 6, and a drive shaft systems 7.

Each attenuator 5 is a circular sector lever made of materials, which has a gross density less than the seawater density. The arc end of each attenuator 5 is immersed into the moving sea surface to capture the sea energy and transformed into a mechanical energy in the form of a surged swing pendulum, While the center tip end of each attenuator 5 is upright and coupled to a pivot shaft as a fulcrum. At the fulcrum, each attenuator 5, a one-way rotation clutch and meshing gear systems 6, and a drive shaft system 7 are coupled together.

The one-way rotation clutch system 6 comprises one or more one-way clutches or bearings to control the rotational direction of the driving torque, while the meshing gear system 6 comprises one or more one-way clutches and bearings to convert an opposite free rotation into an all time one-way direction driving torque. The meshing gear system is coupled to the drive shaft to transmit the converted direction torque.

Hundreds of attenuators 5, the one-way rotation clutch and meshing gear systems 6 are assembled along the drive shaft 7 to be a linear co-axial converter with a linear discrete pattern alignment, by leaving a void or space between each attenuator 5. The channel spacing between each attenuator 5 is adjustable and varies to the degree of severity of the sea wave, the Beaufort scale. More than 4 inch channel spacing is designed for a small wavelet condition, Beaufort number 2, or more than 40 inch channel spacing for a long wave condition, Beaufort number 6.

Not only to be a pivot, the drive shaft utilized as an energy integrator and an energy transmitter. One of the ends of the drive shaft 7 is coupled to an electric generation system 8 to generate electricity and then transmitted ashore by a submarine power cable.

The system for conversion of the whole kinetic energy of sea wave into electricity by One-way Direct drive Shaft Converter (ODSC system) can scale up or link together into a bigger network to gain a higher electricity capacity.

SUMMARY OF THE INVENTION

System for conversion of the whole kinetic energy of sea wave into electricity by One-way Direct drive Shaft Converter, (ODSC system), is an effective system for conversion of the whole kinetic energy from sea wave, both in propagation direction and oscillation direction into electrical energy. Harvesting sea energy by the ODSC system is nearly without limitation, no matter what the physical characteristics of the sea waves are, or how do they fluctuate, and also effective in a rather calm condition because of the innovative adjustable channel spacing of a plurality of attenuator that can vary depending on the severity of the sea wave. Each sectorial energy from the wave front harvested is linear integrated into a powerful torque by a breakthrough one-way rotational direct drive shaft. And with a one-way clutch and gear system, no more energy loss from free run rotation.

The ODSC system comprises 2 main structures, a tower and a floating power plant. A tower is fixed to the seabed by coupling into a massive concrete socket. The tower is utilized as a site station and a pivot of a floating power plant. The floating power plant with a triangle based pyramid framework keeps afloat along with the sea tide by some ship-liked buoyant vessels, and always turns the front of the floating power plant aligning toward the propagation direction of the sea wave, and a ODSC converter system aligning perpendicular against the propagation direction of the sea wave at all time. This self-alignment maximizes an effective energy transfer.

The ODSC converter comprises 3 main structures, a drive shaft, a plurality of attenuators, and a one-way clutch and meshing gear system. A drive shaft is aligned on the floor, parallel to the rearward of the triangular base of the floating power plant. Hundreds of attenuators are coupled to a drive shaft. The attenuator is a circular lever with a circular sector framework made of materials, which the gross density of the attenuator is less than the seawater density. These specific designs of the attenuator's structure minimize the initiation energy or the retard force of starting a movement. The center point tip of each attenuator is erected and served as a fulcrum while the arc end of each attenuator is immersed into the water surface to absorb and transform the whole kinetic energy of the sea wave into a swing mechanical movement. A one-way clutch and meshing gear system is coupled to both attenuator and the drive shaft, to transmit energy, convert the rotation direction, and integrate the all sectorial energy together into a powerful torque which then driving an electric generation system directly. Then the electricity is transmitted ashore via a submarine power cable.

The invention claimed is:

1. A system for conversion the whole kinetic energy of sea wave into electricity comprising:
   a tower;
   a power plant pivotably attached to the tower and secured to a floating structure;
   a shaft;
   a plurality of attenuators attached to the shaft; and
   a one-way rotation clutch, wherein the plurality of attenuators rotates in a first direction while turning the shaft and the plurality of attenuators rotate in a second, opposite direction without turning the shaft, wherein rotation of the shaft provides input to generate power from the power plant.

2. The tower as claimed in claim 1, wherein the tower is anchored to a sea bed.

3. The floating power plant as claimed in claim 1, wherein the floating structure is a steel triangle based pyramid framework.

4. The floating power plant as claimed in claim 1, wherein the floating structure keeps afloat by means of pontoons that is supported at all of the three corners of its triangular based pyramid framework.

5. The floating power plant as claimed in claim 4, wherein the floating structure is a spindle-liked or ship-liked buoyant vessel.

6. The floating power plant as claimed in claim 1, wherein the pivot point for self-alignment is settled in front of a center of mass of the floating power plant.

7. The floating power plant as claimed in claim 3, wherein a front of the floating power plant pivots toward to the wave propagation direction, while the shaft is aligned perpendicular against a direction of wave propagation direction at all time.

8. The floating power plant as claimed in claim 7, wherein the shaft is installed parallel to a rearward member of the triangle based pyramid framework of the floating power plant.

9. The floating power plant as claimed in claim 1, wherein each attenuator is a circular lever with constant radius sector.

10. The floating power plant as claimed in claim 1, wherein each is made of materials having a gross density that is less than a density of seawater.

11. The floating power plant as claimed in claim 1, wherein each attenuator has a circular arc end that is immersed into a sea surface to capture sea energy.

12. The floating power plant as claimed in claim 1, wherein each attenuator has a center tip end that is upright and coupled to the shaft and utilized as a fulcrum.

13. The floating power plant as claimed in claim 12, wherein the shaft is a pivot of the one-way rotation clutch and a meshing gear.

14. The floating power plant as claimed in claim 12, wherein the one-way rotation clutch, a meshing gear and the shaft are coupled together.

15. The floating power plant as claimed in claim 1, comprising one or more of the one-way rotation clutches or bearings to control the rotation direction of a driving torque.

16. The floating power plant as claimed in claim 13, further comprising one or more of the one-way rotation clutches and bearings to convert an opposite free rotation into an all time one-way rotation driving torque.

17. The floating power plant as claimed in claim 13, wherein the meshing gear is coupled to the shaft to transmit a direction converted torque.

18. The floating power plant as claimed in claim 1, wherein the attenuators are aligned along the shaft in a discrete pattern alignment.

19. The floating power plant as claimed in claim 18, wherein a channel spacing between adjacent ones of the attenuators is adjustable and varies directly with a severity of sea waves.

20. The floating power plant as claimed in claim 1, wherein one of the ends of the shaft is coupled to an electric generation system to generate electricity and then transmit the electricity ashore by a submarine power cable.

* * * * *